(No Model.)
M. T. REEVES.
BEARING FOR THRASHING CYLINDER SHAFTS.
No. 539,237. Patented May 14, 1895.
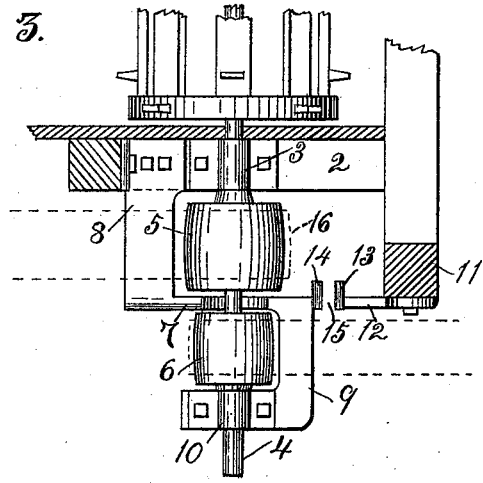
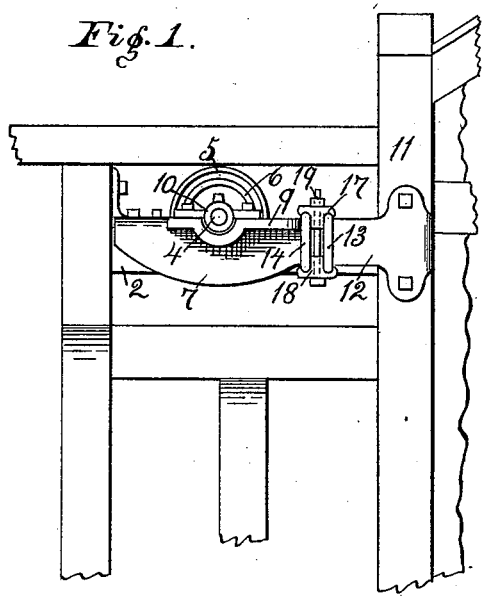
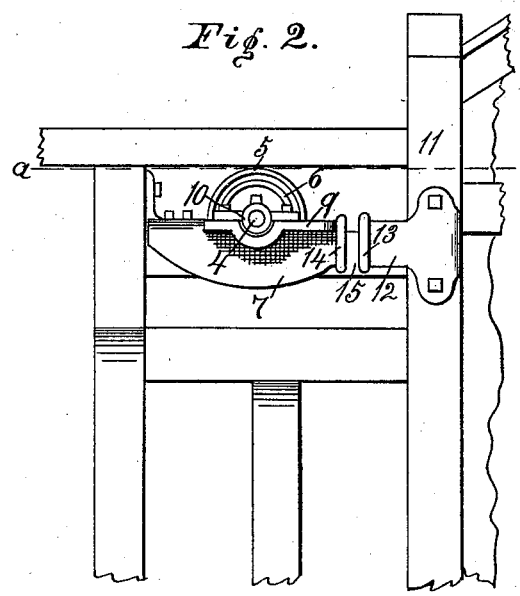
Witnesses
V. M. Hood.
M. V. Hood
Inventor
Marshal T. Reeves.
By Attorney
H. P. Hood.

United States Patent Office.

MARSHAL T. REEVES, OF COLUMBUS, INDIANA, ASSIGNOR TO REEVES & CO., OF SAME PLACE.

BEARING FOR THRASHING-CYLINDER SHAFTS.

SPECIFICATION forming part of Letters Patent No. 539,237, dated May 14, 1895.

Application filed March 1, 1895. Serial No. 540,150. (No model.)

*To all whom it may concern:*

Be it known that I, MARSHAL T. REEVES, a citizen of the United States, residing at Columbus, in the county of Bartholomew and State of Indiana, have invented a new and useful Improvement in Bearings for Thrashing-Cylinder Shafts, of which the following is a specification.

My invention relates to an improved bearing for the over-hanging end of a thrashing-cylinder shaft.

In thrashing machines the thrashing-cylinder shaft projects outward from the machine casing, and carries a pulley for driving the shaft, and usually one or more pulleys for driving other parts of the thrashing mechanism.

The object of my improvement is, to provide a bearing for the support of the outer end of the shaft, said bearing being so constructed as to permit the placing of belts drawing in opposite directions upon the pulleys carried by the shaft, without cutting or unlacing the belt; and at the same time forming a firm support for the shaft.

The accompanying drawings illustrate my invention.

Figure 1 represents a side elevation of a portion of the thrashing-machine casing and my improved bearing mounted thereon, the bearing being shown in its complete condition. Fig. 2 represents a similar elevation showing the bearing prepared to receive the belt upon the pulley nearest the machine-casing. Fig. 3 represents a plan at *a*, Fig. 2.

In the drawings, 2, indicates a portion of the machine frame carrying the main bearing, 3, in which the cylinder shaft, 4, is mounted. The pulley, 5, which receives the belt for driving the thrashing-cylinder, is mounted on the shaft 4 outside the machine casing, and a second pulley, 6, is also mounted on the shaft 4 outside of the pulley 5, for driving other parts of the thrashing mechanism. For the purpose of forming a firm support for the overhanging end of the shaft, I provide a casting consisting of a plate, 7, adapted to pass between the opposed ends of the pulleys 5 and 6, beneath the shaft, and carrying at one end a laterally projecting arm, 8, which is adapted to be bolted to the machine frame, and carrying at the other end an oppositely projecting bent arm, 9, having formed therein, or secured thereto, a journal bearing, 10, which is adapted to receive the shaft.

The arrangement of plate 7, and arms 8 and 9, is such that two endless belts drawing in opposite directions, as indicated in dotted lines, Fig. 3, may be placed upon the pulleys without unlacing. It is, however, necessary for the firm support of the bearing, to provide another point of attachment to the main frame, which must be so constructed as to form, when complete, a solid continuation of plate 7, but at the same time permit the passage of the bight of that belt which is mounted on the innermost pulley. For this purpose I secure to a projecting part, 11, of the main frame, a short arm, 12, having its free end provided with a laterally projecting lug, 13, whose upper and under edges are rounded, as shown.

Formed upon the end of plate 7 and opposite lug 13, is a similar lug, 14, there being between lugs 13 and 14 a narrow space, 15, through which the belt, 16, may be passed. When the belt is in position, lugs 13 and 14 are connected and clamped solidly together by means of two metallic blocks, 17, and 18, which each fill a portion of the space 15, and embrace the rounded edges of the lugs 13 and 14, being tightly clamped thereon by means of a bolt, 19, which passes through and connects the blocks, thus strongly connecting arm 12 and plate 7.

I claim as my invention—

1. In a shaft bearing, the combination with the main frame, the main bearing secured thereto, and the shaft mounted in said bearing and projecting outward from said frame, of the bearing for the outer end of the shaft, consisting of the central plate, the arms projecting laterally in opposite directions from the opposite ends of said plate, one of said arms being adapted to be secured to the main frame, and the other of said arms forming a journal bearing for the projecting end of the shaft, the short arm secured to the main frame opposite the end of said plate, the lugs formed upon the opposed ends of said plate and arm, there being a narrow space between them, the pair of blocks adapted to fit into said space, and to embrace the edges of the lugs, and the clamping-bolt arranged to draw said blocks together, all arranged to co-operate in the manner and for the purpose set forth.

2. In a shaft bearing, the combination with the main frame having projecting portion 11, and carrying a journal bearing 3 and a shaft mounted therein, of the bearing consisting of the casting adapted to be secured at one end to the main frame, and carrying at the opposite end a journal-bearing adapted to receive the projecting end of the shaft; the short arm secured to the projecting portion of the main frame, and intermediate mechanism connecting said casting and said short arm, and removably secured thereto, all arranged to co-operate substantially as set forth.

MARSHAL T. REEVES.

Witnesses:
H. P. HOOD,
V. M. HOOD.